United States Patent
Daikuhara et al.

(10) Patent No.: US 12,512,454 B2
(45) Date of Patent: Dec. 30, 2025

(54) ELECTRODE SHEET MANUFACTURING METHOD

(71) Applicant: TOYOTA JIDOSHA KABUSHIKI KAISHA, Toyota (JP)

(72) Inventors: Shugo Daikuhara, Nisshin (JP); Takenori Ikeda, Owariasahi (JP); Satoshi Moriyama, Nagoya (JP); Yuta Kawamoto, Kariya (JP); Keigo Oyaizu, Kariya (JP); Suguru Nomimura, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 566 days.

(21) Appl. No.: 18/057,797

(22) Filed: Nov. 22, 2022

(65) Prior Publication Data

US 2023/0238504 A1    Jul. 27, 2023

(30) Foreign Application Priority Data

Jan. 21, 2022  (JP) ................. 2022-007639

(51) Int. Cl.
*H01M 4/04* (2006.01)

(52) U.S. Cl.
CPC ....... *H01M 4/0416* (2013.01); *H01M 4/0435* (2013.01)

(58) Field of Classification Search
CPC .......................... H01M 4/0416; H01M 4/0435
USPC .......................................... 429/209
See application file for complete search history.

(56) References Cited

U.S. PATENT DOCUMENTS

| 6,497,979 | B1 | 12/2002 | Iijima et al. | |
| 2006/0228627 | A1* | 10/2006 | Nakayama | H01M 4/137 526/87 |
| 2015/0263348 | A1* | 9/2015 | Wakizaka | H01M 10/0525 252/182.1 |
| 2017/0117583 | A1* | 4/2017 | Matsuno | H01M 4/505 |
| 2018/0151866 | A1* | 5/2018 | Yamamoto | H01M 4/1393 |
| 2021/0202932 | A1* | 7/2021 | Fukumoto | H01M 4/134 |

FOREIGN PATENT DOCUMENTS

| JP | H11-045706 A | 2/1999 |
| JP | 2018032604 A | 3/2018 |
| JP | 2019087330 A | 6/2019 |
| JP | 2019106311 A | 6/2019 |
| JP | 2020047434 A | 3/2020 |
| WO | 2014/058040 A1 | 4/2014 |

* cited by examiner

*Primary Examiner* — James M Erwin
(74) *Attorney, Agent, or Firm* — SoraIP, Inc.

(57) ABSTRACT

An electrode sheet manufacturing method includes preparing a wet powder that contains an active material and a volatile liquid, and of which a BET specific surface area is 50 cm$^2$/g or more, performing film formation of an active material sheet by spreading the wet powder, and manufacturing an electrode sheet by disposing the active material sheet on a surface of a backing material.

4 Claims, 3 Drawing Sheets

ELECTRODE SHEET MANUFACTURING METHOD

CROSS-REFERENCE TO RELATED APPLICATION

This application claims priority to Japanese Patent Application No. 2022-007639 filed on Jan. 21, 2022, incorporated herein by reference in its entirety.

BACKGROUND

1. Technical Field

The present disclosure relates to an electrode sheet manufacturing method.

2. Description of Related Art

Japanese Unexamined Patent Application Publication No. 2019-106311 (JP 2019-106311 A) discloses an electrode sheet manufacturing method using a wet powder containing a volatile liquid such as water or alcohol.

Further, JP 2019-106311 A discloses that when an electrode composite material consisting of the wet powder passes through a gap between two opposing rolls, controlling liquid bridge force between the wet powder and the surfaces of the rolls to an appropriate region enables an electrode sheet to be obtained in which film formation defects are less likely to occur. Film formation defects refer to a state in which pores are formed in a film of the electrode composite material. There are cases in which an electrode sheet with many film formation defects cannot be appropriately used as an electrode sheet for making up a battery.

SUMMARY

There is demand for further improvement in productivity when manufacturing electrode sheets from wet powders. In order to improve the productivity of electrode sheets, further reduction in occurrence of film formation defects is desired.

Accordingly, the present disclosure provides an electrode sheet manufacturing method in which film formation defects are less likely to occur.

(1) An electrode sheet manufacturing method according to one aspect of the present disclosure includes preparing a wet powder that contains an active material and a volatile liquid, and of which a Brunauer-Emmett-Teller (BET) specific surface area is 50 cm$^2$/g or more, performing film formation of an active material sheet by spreading the wet powder, and manufacturing an electrode sheet by disposing the active material sheet on a surface of a backing material.

It is thought that when spreadability of the wet powder decreases as the volatile liquid contained in the wet powder volatilizes, film formation defects tend to occur in the film of the electrode composite material. As a result, there is a concern that not being able to use the film of the electrode composite material appropriately as an electrode sheet will reduce production of the electrode sheet. In addition, it is thought that when spreadability of the wet powder decreases as the volatile liquid contained in the wet powder volatilizes, the load applied to the surface of the active material increases. This also raises the concern that film formation defect will readily occur in the film of the electrode composite material.

According to this aspect of the present disclosure, by setting the BET specific surface area of the wet powder to 50 cm$^2$/g or more, film formation defects are less likely to occur during film formation of the active material sheet. Setting the BET specific surface area of the wet powder to 50 cm$^2$/g or more suppresses decrease in spreadability of the wet powder due to volatilization of the volatile liquid contained in the wet powder. Accordingly, it is thought that film formation defects of the film of the electrode composite material are less likely to occur. It is also thought that the load applied to the surface of the active material can be reduced.

(2) Time between preparation of the wet powder and film formation of the active material sheet may be five minutes or less.

Setting this time to five minutes or less further suppresses volatilization of the volatile liquid, and accordingly it is thought that film formation defects are less likely to occur in the film of the electrode composite material.

(3) An electrode sheet manufacturing method according to another aspect of the present disclosure includes
preparing a wet powder containing an active material and a volatile liquid,
compressing the wet powder such that a BET specific surface area is 20 cm$^2$/g or less,
crushing the wet powder such that the BET specific surface area is 50 cm$^2$/g or more,
performing film formation of an active material sheet by spreading the wet powder, and
manufacturing an electrode sheet by disposing the active material sheet on a surface of a backing material.

It is thought that when spreadability of the wet powder decreases as the volatile liquid contained in the wet powder volatilizes, film formation defects tend to occur in the film of the electrode composite material, as described above. Accordingly, suppressing volatilization of the volatile liquid is conceivable in order to suppress the occurrence of film formation defects in the film of the electrode composite material. Reducing the specific surface area of the wet powder is conceivable as a method for suppressing volatilization of the volatile liquid. However, there is a concern that reducing the specific surface area of the wet powder may lead to roughness occurring at edges of the electrode composite material in a width direction, during film formation. Also, when film formation itself becomes difficult, there is a concern that production will decrease.

According to another aspect of the present disclosure, a wet powder containing an active material and a volatile liquid is prepared, following which the wet powder is compressed to a BET specific surface area of 20 cm$^2$/g or less, so that volatilization of the volatile liquid does not readily occur. Thereafter, the wet powder is crushed to have a BET specific surface area of 50 cm$^2$/g or more, and accordingly film formation defects occur less readily in the film of the electrode composite material, as described above.

(4) Time between crushing of the wet powder and film formation of the active material sheet may be five minutes or less.

(5) A process of storing the wet powder may be further provided between compressing the wet powder and crushing the wet powder.

(6) The volatile liquid may contain water, for example.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
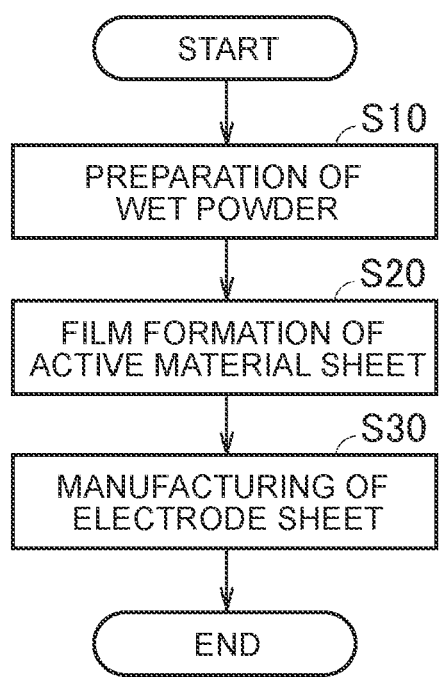
FIG. 1 is a schematic flowchart of an electrode sheet manufacturing method according to a first embodiment.

Hereinafter, embodiments of the present disclosure (hereinafter can be abbreviated to simply "present embodiments") and examples of the present disclosure (hereinafter can be abbreviated to simply "present examples") will be described. It should be noted, however, that the present embodiments and the present examples are not intended to limit the technical scope of the present disclosure.

Definition of Terms, Etc.

In the present specification, the terms "comprise," "include," "have," and variations thereof (e.g., "composed of" or the like) are open-ended. Additional elements may or may not be included in addition to essential elements in open-ended terms. The term "consist of" is closed-ended. However, even closed-ended terms do not exclude normally-associated impurities and additional elements that are irrelevant to the technology according to the present disclosure. The term "substantially consist of" is semi-closed-ended. Semi-closed-ended terms allow addition of elements that do not substantially affect the basic and novel characteristics of the technology according to the present disclosure.

In the present specification, the words such as "may" and "can" are used in a permissive sense, meaning that "it is possible," rather than in a mandatory sense, meaning "must."

In the present specification, numerical ranges such as "m % to n %", for example, include upper and lower limit values thereof unless otherwise specified. That is, "m % to n %" indicates the numerical range of "m % or more and n % or less". Further, "m % or more and n % or less" includes "more than m % and less than n %". Further, a numerical value optionally selected from within a numerical range may be set as a new upper limit value or a new lower limit value. For example, a new numerical range may be set by optionally combining a numerical value in the numerical range and a numerical value described in a different part of the present specification, a table, the drawings, or the like.

The term "wet powder" in the present specification refers to a dispersion in which a liquid is dispersed in a powder.

The term "electrode" as used in the present specification is a collective term for anodes and cathodes. An electrode may be an anode or may be a cathode. Electrodes may be applied to optional usages. An electrode may be for a battery, for example. In the present specification, an electrode for a lithium-ion battery will be described, as an example.

The term "volatile liquid" in the present specification refers to a liquid having a boiling point of 50° C. to 240° C. Volatile liquids may, for example, have a boiling point of 75° C. to 150° C., or may have a boiling point of 75° C. to 125° C.

The term "solid content" as used in the present specification refers to the mass fraction of solid components in the wet powder. Note that a solute dissolved in a solvent is regarded as being a solid component.

The term "BET specific surface area" as used in the present specification refers to a specific surface area calculated by the multipoint Brunauer-Emmett-Teller (BET) method in an adsorption isotherm measured by gas adsorption. The adsorbate gas is nitrogen gas. The BET specific surface area is measured three times or more for one measurement object. The arithmetic mean of three or more results is taken as the BET specific surface area of the measurement object.

In the present specification, D50 of an active material indicates a particle size in which the cumulative frequency in order from the smallest particle sizes reaches 50% in a volume-based particle size distribution. The volume-based particle size distribution can be measured by laser diffraction scattering.

In the present specification, D50 of the wet powder indicates a particle size in which the cumulative frequency in order from the smallest particle sizes reaches 50% in a mass (count)-based particle size distribution. The mass-based particle size distribution can be measured in accordance with "JIS Z8815 Test sieving—General requirements".

The term "state of charge (SOC)" as used in the present specification represents the percentage of the level of charge as to the full charge capacity at that point in time.

First Embodiment

FIG. 1 is a schematic flowchart of an electrode sheet manufacturing method according to a first embodiment. Hereinafter, the phrase, "electrode sheet manufacturing method according to the present embodiment" can be abbreviated to "present manufacturing method". This manufacturing method includes "preparation of wet powder (S10)", "film formation of active material sheet (S20)" and "manufacturing of electrode sheet (S30)". Preparation of Wet Powder (S10)

The present manufacturing method includes preparing a wet powder that contains an active material and a volatile liquid, and that has a BET specific surface area of 50 $cm^2$/g or more. By setting the BET specific surface area of the wet powder to 50 $cm^2$/g or more, film formation defects are less likely to occur during film formation of an active material sheet. The wet powder preferably has a BET specific surface area of 60 $cm^2$/g or more.

For example, a wet powder may be created by mixing an active material and a volatile liquid. For example, at least one selected from a group consisting of an electroconductive material, a solid electrolyte, and a binder, may be mixed into the wet powder.

For example, an agitating granulator may be used to mix an active material, a volatile liquid, and so forth. A planetary mixer, a three roll mill, or the like, for example, may be used to create the wet powder. One-step mixing may be carried out, or multi-step mixing may be carried out. For example, the wet powder may be formed by mixing an active material, a volatile liquid, and so forth, in a planetary mixer. The wet powder may be kneaded by a three roll mill.

The wet powder mixed or kneaded by the above method may be further crushed by, for example, a high speed mixer, a ball mill, a hammer mill, or the like. Thus, the BET specific surface area can be further increased.

The wet powder may be created having a solid content of 70% or more, for example. The wet powder may be created having a solid content of 70% to 90%, for example. The wet powder may be created having a solid content of 75% to 85%, for example.

The wet powder can be granular, flake-like, clay-like or the like. The properties of the wet powder can be adjusted by the solid content, the mixing conditions, and so forth, for example.

The wet powder may be created having a D50 of 4 mm or less, for example. The wet powder may be created having a D50 of 0.1 mm to 4 mm, or may be created having a D50 of 0.5 mm to 2 mm, for example.

The active material may be in the form of particles, for example. The active material may have a D50 of 0.5 μm to 50 μm, or may have a D50 of 1 μm to 10 μm, for example.

The active material may contain an cathode active material. The active material may contain at least one selected from a group consisting of, for example, $LiCoO_2$, $LiNiO_2$, $LiMnO_2$, $LiMn_2O_4$, $Li(NiCoMn)O_2$, $Li(NiCoAl)O_2$, and $LiFePO_4$. For example, "(NiCoMn)" in "$Li(NiCoMn)O_2$" indicates that the total composition ratio inside the parentheses is 1. Amounts of individual components are optional as long as the total is 1. $Li(NiCoMn)O_2$ may include, for example, $Li(Ni_{1/3}Co_{1/3}Mn_{1/3})O_2$, $Li(Ni_{0.5}Co_{0.2}Mn_{0.3})O_2$, $Li(Ni_{0.5}Co_{0.1}Mn_{0.1})O_2$, and so forth. The active material may contain a anode active material. The active material may contain at least one selected from a group consisting of, for example, graphite, soft carbon, hard carbon, silicon, silicon oxide, silicon-based alloys, tin, tin oxide, tin-based alloys, and $Li_4Ti_5O_{12}$.

The volatile liquid may include at least one selected from a group consisting of, for example, water, N-methyl-2-pyrrolidone (NMP), alcohol (e.g., ethanol, propanol, or the like), and ester (e.g., butyl butyrate, etc.). The volatile liquid may have a boiling point of 150° C. or lower, from the perspective of thermal energy when drying. The amount of the volatile liquid that is contained can be determined in accordance with the solid content of the wet powder.

The amount of the binder that is contained may be, for example, 0.1 to 10 parts by mass, with respect to 100 parts by mass of the active material. The binder may contain any component. The binder may contain at least one selected from a group consisting of, for example, polyvinylidene difluoride (PVDF), poly(vinylidene fluoride-co-hexafluoropropylene) (PVDF-HFP), polytetrafluoroethylene (PTFE), styrene butadiene rubber (SBR), carboxymethyl cellulose (CMC), polyacrylic acid (PAA), polyamideimide (PAI), and polyimide (PI).

The amount of the electroconductive material that is contained may be, for example, 0.1 to 10 parts by mass, with respect to 100 parts by mass of the active material. The electroconductive material may contain, for example, electroconductive carbon particles, electroconductive carbon fibers, and so forth. The electroconductive material may contain at least one selected from a group consisting of, for example, carbon black, vapor-grown carbon fibers (VGCF), carbon nanotubes (CNT), and graphene flakes. The carbon black may contain at least one selected from a group consisting of, for example, acetylene black, Ketjen black (a registered trademark), furnace black, channel black, and thermal black.

The amount of the solid electrolyte that is contained may be, for example, 1 to 100 parts by volume with respect to 100 parts by volume of the active material. The solid electrolyte may contain at least one selected from a group consisting of, for example, $Li_2S$—$P_2S_5$, $LiI$—$Li_2S$—$P_2S_5$, $LiBr$—$Li_2S$—$P_2S_5$, and $LiI$—$LiBr$—$Li_2S$—$P_2S_5$.

Film Formation of Active Material Sheet (S20)

The present manufacturing method includes film formation of an active material sheet by spreading the wet powder. The wet powder can be spread by any method. The wet powder may be spread by roll forming, for example.

Figure 3:
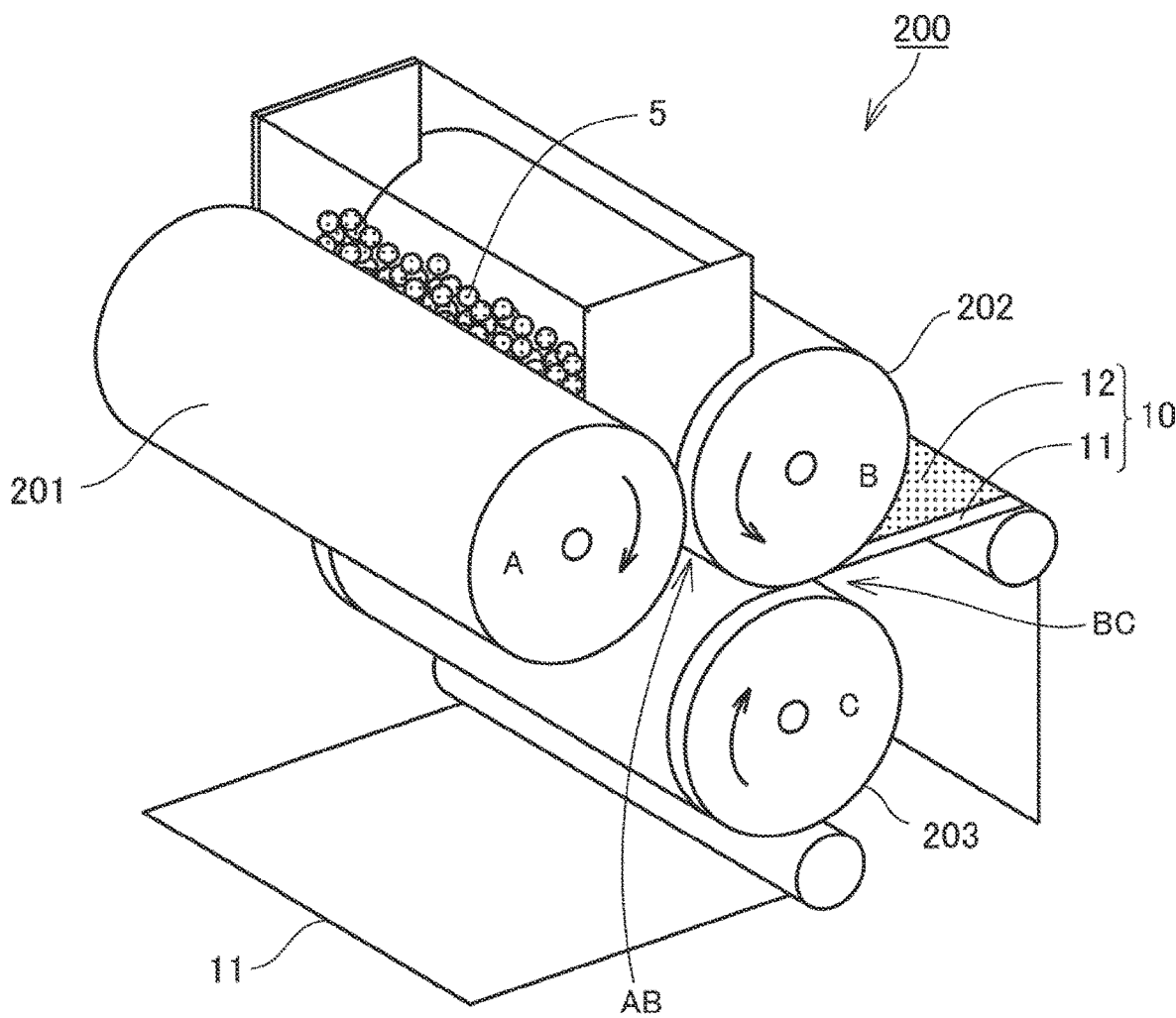
FIG. 3 is a schematic view illustrating an example of a film formation apparatus.

FIG. 3 is a schematic view illustrating an example of a film formation apparatus. The film formation apparatus 200 can manufacture an electrode sheet 10 by roll-to-roll processing. The film formation apparatus 200 can carry out roll forming and roll transfer.

The film formation apparatus 200 includes a first roll 201, a second roll 202, and a third roll 203. The rolls rotate in directions indicated by arrows. Axes of rotation of the rolls are parallel. A relation of "$\omega 1 < \omega 2 < \omega 3$", for example, may be satisfied when a rotation speed of the first roll 201 is $\omega 1$, a rotation speed of the second roll 202 is $\omega 2$, and a rotation speed of the third roll 203 is $\omega 3$.

A gap AB is formed between the first roll 201 and the second roll 202. A wet powder 5 is supplied to the gap AB. An active material sheet 12 is formed by compacting and spreading the wet powder 5 at the gap AB. The active material sheet 12 may have a thickness of 10 μm to 500 μm, or may have a thickness of 50 μm to 200 μm, for example.

Also, the time between S10 and S20 is preferably five minutes or less. Thus, volatilization of the volatile liquid is further suppressed, and film formation defects are less likely to occur in the film of electrode composite material. More preferably, the time between S10 and S20 is three minutes or less.

Manufacturing of Electrode Sheet (S30)

The present manufacturing method includes manufacturing the electrode sheet 10 by disposing the active material sheet 12 on a surface of a backing material 11. Thereafter, processing can be performed in the film formation apparatus 200. A gap BC is formed between the second roll 202 and the third roll 203. The second roll 202 conveys the active material sheet 12 to the gap BC (see FIG. 3). The third roll 203 conveys the backing material 11 to the gap BC.

At the gap BC, the active material sheet 12 is rubbed against the surface of the backing material 11. Thus, the active material sheet 12 adheres to the surface of the backing material 11. The electrode sheet 10 is manufactured by adhering the active material sheet 12 to the backing material 11.

The active material sheet 12 may be disposed on just one side of the backing material 11, or may be disposed on both front and back faces of the backing material 11. The electrode sheet 10 may be dried. The electrode sheet 10 may be compressed. The electrode sheet 10 may be cut, for example, in accordance with battery design.

The backing material 11 may have a thickness of, for example, 5 μm to 50 μm. The backing material 11 may have electroconductivity. The backing material 11 may contain metal foil or the like, for example. The backing material 11 may contain at least one selected from a group consisting of aluminum (Al) foil, Al alloy foil, copper (Cu) foil, Cu alloy foil, titanium (Ti) foil, stainless steel (SUS) foil, nickel (Ni) plated SUS foil, and Ni foil.

Second Embodiment

Figure 2:
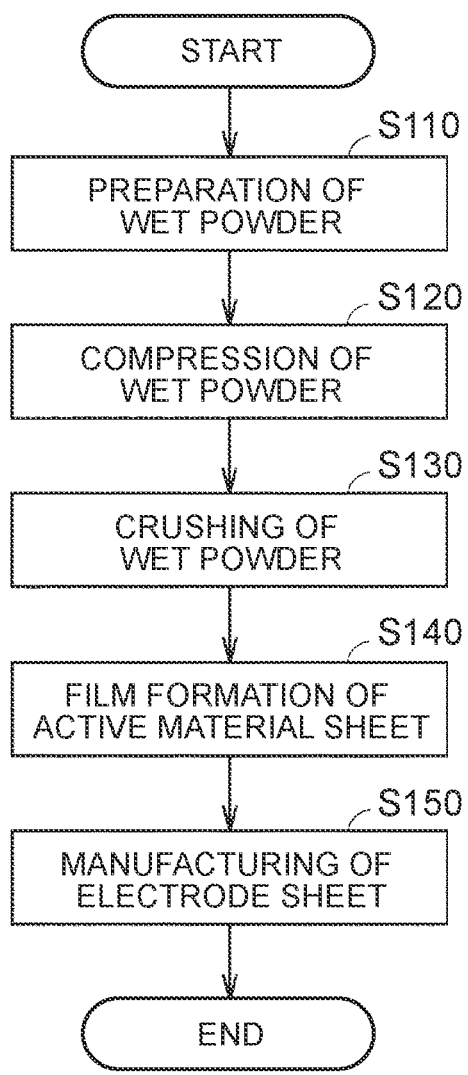
FIG. 2 is a schematic flowchart of an electrode sheet manufacturing method according to a second embodiment.

FIG. 2 is a schematic flowchart of an electrode sheet manufacturing method according to a second embodiment. The present manufacturing method includes "preparation of wet powder (S110)", "compression of wet powder (S120)", "crushing of wet powder (S130)", and "film formation of active material sheet (S140)", and "manufacturing of electrode sheet (S150)". Note that description redundant with the first embodiment will be omitted.

Compression of Wet Powder (S120)

The present manufacturing method includes compressing the wet powder to reduce the BET specific surface area to 20 cm$^2$/g or less. Thus, the volatile liquid does not readily volatilize. The wet powder preferably has a BET specific surface area of 15 cm$^2$/g or less.

The shape of the wet powder after compression is not limited in particular, and examples thereof include spherical, ellipsoidal, cylindrical, elliptical cylinder, prismatic, discoid, and other such shapes. The maximum diameter of the wet powder after compression is, for example, 4 mm to 10 mm. For compression, a compression shaping machine such as a granulator, a pelleting press, a tablet press, and so forth, can be used.

Crushing of Wet Powder (S130)

The present manufacturing method includes crushing the compressed wet powder to raise the BET specific surface area to 50 cm$^2$/g or more. A high-speed mixer, a ball mill, a hammer mill, or the like, can be used for the crushing.

Storage of Wet Powder

The present manufacturing method may include a step of storing the wet powder after compression, between S120 and S130. This is because the BET specific surface area of the wet powder after compression is 20 cm$^2$/g or less, and accordingly the volatile liquid does not readily volatilize even during storage. The storage time is not limited in particular, but may be 30 minutes, 60 minutes, 120 minutes, or 180 minutes.

Third Embodiment

Figure 4:
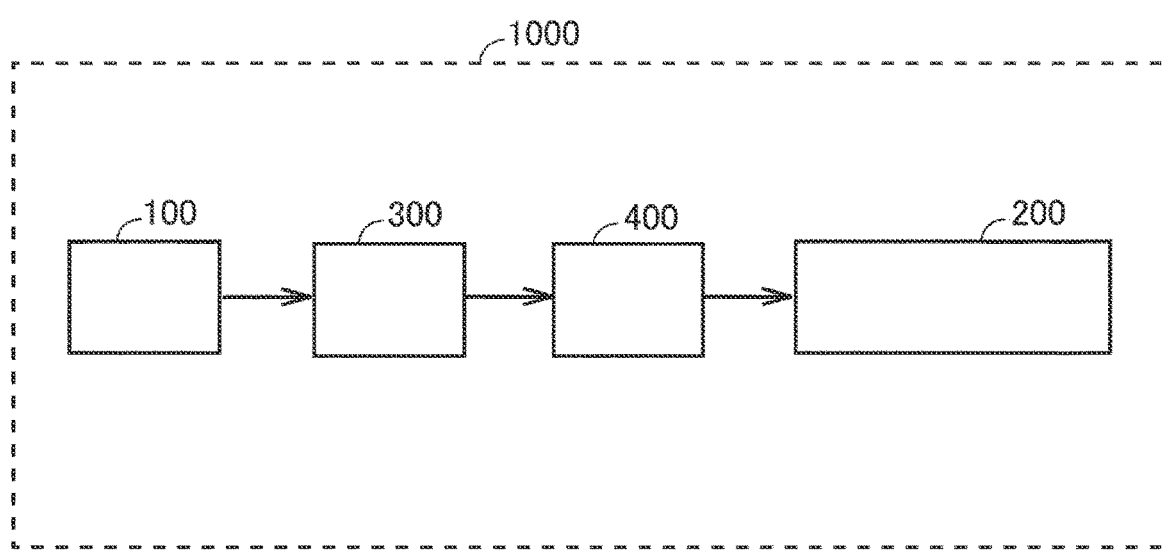
FIG. 4 is a conceptual diagram of an electrode sheet manufacturing system.

FIG. 4 is a conceptual diagram of an electrode sheet manufacturing system according to the present embodiment. Hereinafter, the phrase, "electrode sheet manufacturing system according to the present embodiment" can be abbreviated to "present manufacturing system". The present manufacturing system 1000 includes a mixing apparatus 100 and a film formation apparatus 200. The present manufacturing system 1000 may further include a compression shaping apparatus 300 and a crushing apparatus 400. The present manufacturing system 1000 may further include, for example, a conveyer, a dryer (e.g., a hot air drying oven or the like), a cutter (e.g., a rotary slitter or the like), and so forth.

The mixing apparatus 100 is configured to create the wet powder by mixing the active material and the volatile liquid. The wet powder is supplied to the film formation apparatus 200. For example, a conveyer may convey the wet powder to the film formation apparatus 200. The film formation apparatus 200 is configured to perform film formation of the active material sheet by spreading the wet powder.

The wet powder created by the mixing apparatus 100 may also be supplied to the compression shaping apparatus 300. The compression shaping apparatus 300 compresses and shapes the wet powder. The wet powder that is compressed and shaped may be supplied to the crushing apparatus 400. The crushing apparatus 400 crushes the wet powder that is compressed and shaped. The wet powder that is crushed is supplied to the film formation apparatus 200.

Manufacturing of Electrode Sheet

Electrode sheets No. 1 and No. 2 were manufactured as described below. Hereinafter, the "electrode sheet No. 1" can be abbreviated to simply "No. 1", for example.

No. 1

The following electrode materials were prepared.

Active material: LiFePO$_4$ (particle surfaces coated with carbon)

Volatile liquid: water

Electroconductive material: carbon nanotubes (CNT)

Binder: carboxymethyl cellulose (CMC) and styrene butadiene rubber (SBR)

A planetary mixer and a three roll mill were prepared. A wet powder was created by kneading the electrode material of a predetermined composition with the planetary mixer and the three roll mill. The solid content of the wet powder was 75% or more.

A high speed mixer was prepared. The wet powder was crushed by the high speed mixer. The BET specific surface area of the wet powder that was crushed was 70.0 cm$^2$/g. The BET specific surface area was measured using a gas adsorption measurement device (3Flex, manufactured by Shimadzu Corporation) (the same applies to No. 2 below). The wet powder that was crushed was stored for 120 minutes.

The film formation apparatus 200 (see FIG. 3) was prepared. Film formation of the active material sheet 12 was performed by supplying the wet powder 5 that was crushed to the film formation apparatus 200. Further, the active material sheet 12 was disposed on the surface of the backing material 11, thereby manufacturing the electrode sheet 10.

No. 2

An electrode material, the same as that of No. 1 was prepared. A wet powder was created by kneading the electrode material of a predetermined composition by the planetary mixer and the three roll mill, in the same way as in No. 1. The solid content of the wet powder was 75% or more.

A tablet press was prepared. The wet powder was compressed and shaped by the tablet press. The BET specific surface area of the wet powder that was compressed and shaped was 11.2 cm$^2$/g. The wet powder following compressing was stored for 120 minutes.

The wet powder was crushed by the high speed mixer, in the same way as in No. 1. The BET specific surface area of the wet powder that was crushed was 68.4 cm$^2$/g.

Film formation of the active material sheet 12 was performed by supplying the wet powder 5 that was crushed to the film formation apparatus 200, in the same way as in No. 1. The time from crushing the wet powder 5 to supplying to the film formation apparatus 200 was three minutes. Further, the active material sheet 12 was disposed on the surface of the backing material 11, thereby manufacturing the electrode sheet 10.

Evaluation

Film Formation Defects

Presence or absence of film formation defects on the surface of the electrode sheet 10 (active material sheet 12) was confirmed by eye. The results are shown in "Film formation defects" in Table 1 below.

Output Performance

The electrode sheets were cut to a predetermined size. Small-sized batteries containing the electrode sheets were manufactured. Output thereof was measured by a constant current charge/discharge test. In the present test, the SOC of each small-sized battery was adjusted to 80%, and the target output value was 1500 mW. The results are shown in "Output value (mW)" in Table 1 below.

TABLE 1

|  | No. 1 | No. 2 |
| --- | --- | --- |
| Film Formation defects | Present | Absent |
| Output performance (mW) | 1384 | 1506 |

Results

Film formation defects were confirmed in the electrode sheet (active material sheet) No. 1. Also, the output of the battery containing No. 1 was below the target of 1500 mW.

On the other hand, no film formation defects were confirmed in the electrode sheet (active material sheet) No. 2. Also, the output of the battery containing No. 2 exceeded the target of 1500 mW.

It should be considered that the embodiments and the examples disclosed herein are exemplary in all respects and not restrictive. The scope of the present disclosure is set forth in the claims and not the above description, and is intended to encompass all modifications within the meaning and scope equivalent to those of the claims.

What is claimed is:

1. An electrode sheet manufacturing method, comprising:
   preparing a wet powder containing an active material and a volatile liquid;
   compressing the wet powder such that a BET specific surface area is 20 $cm^2/g$ or less;
   crushing the wet powder such that the BET specific surface area is 50 $cm^2/g$ or more;
   performing film formation of an active material sheet by spreading the wet powder; and
   manufacturing an electrode sheet by disposing the active material sheet on a surface of a backing material.

2. The electrode sheet manufacturing method according to claim 1, wherein time between crushing of the wet powder and film formation of the active material sheet is five minutes or less.

3. The electrode sheet manufacturing method according to claim 2, further comprising storing the wet powder, wherein storing of the wet powder is performed between compressing the wet powder and crushing the wet powder.

4. The electrode sheet manufacturing method according to claim 1, wherein the volatile liquid is water.

* * * * *